United States Patent [19]
Nichols

[11] Patent Number: 6,152,423
[45] Date of Patent: Nov. 28, 2000

[54] CONTROL VALVE MAIN SEAL RETAINER WITH AN ASSEMBLY AND REMOVAL TOOL

[75] Inventor: Jimmy Brooks Nichols, Statesboro, Ga.

[73] Assignee: Micro Motion, Inc., Boulder, Colo.

[21] Appl. No.: 09/072,228

[22] Filed: May 4, 1998

[51] Int. Cl.⁷ ........................................................ F16K 1/06
[52] U.S. Cl. ............................................. 251/360; 251/367
[58] Field of Search ..................................... 251/359, 360, 251/361, 362, 363, 364, 365, 366, 367, 900

[56] References Cited

U.S. PATENT DOCUMENTS

| | | | |
|---|---|---|---|
| 2,621,011 | 12/1952 | Smith | 251/359 |
| 3,054,594 | 9/1962 | Hecht | 251/362 |
| 4,268,045 | 5/1981 | Traub . | |
| 4,399,976 | 8/1983 | Legris | 251/900 |

FOREIGN PATENT DOCUMENTS

| | | | |
|---|---|---|---|
| 167793 | 4/1954 | Australia | 251/900 |
| 0 675 304 A1 | 10/1995 | European Pat. Off. . | |
| 2165250 | 8/1973 | France . | |
| 1007226 | 10/1965 | United Kingdom . | |
| 1385882 | 3/1975 | United Kingdom . | |

*Primary Examiner*—Pamela Wilson
*Assistant Examiner*—Ken B. Rinehart
*Attorney, Agent, or Firm*—Duft, Graziano & Forest, P.C.

[57] ABSTRACT

A system for sealing a head end of a cylinder to prevent a material flow through the cylinder. An o-ring inside the cylinder surrounds a piston when the piston is in a closed position inside the cylinder to prevent material from leaking into the cylinder around the piston. The o-ring is held in position by a groove inside the cylinder wall proximate a head end of the cylinder. A retainer ring has a first end held in place by a step protruding from the cylinder wall and a second end extending into a second end of the o-ring. The retainer ring applies a force to the retainer-ring which holds the o-ring inside the groove. The o-ring also applies a force to the retainer ring holding the o-ring in place.

8 Claims, 4 Drawing Sheets

6,152,423

CONTROL VALVE MAIN SEAL RETAINER WITH AN ASSEMBLY AND REMOVAL TOOL

FIELD OF THE INVENTION

This invention relates to a valve having a retainer for an o-ring in a cylinder for sealing the cylinder when a piston is in a closed position in the cylinder. This invention also relates to a tool and method for insertion and removal of the retainer and o-ring in the cylinder.

PROBLEM

It is common to use a control valve to control the flow of material through a pipeline. One type of control valve has a cylinder that has an inlet at a head end of the cylinder and an outlet in a side wall of the cylinder. A piston slides through the cylinder to control the material flow through the cylinder. The position of the piston is controlled by a spring and the flow of material through a control line. As the pressure of material on a nose of the piston overcomes the pressure of the material in the control line and the spring on the back side of the piston, the piston moves upwards in the cylinder and allows material to flow through the cylinder. In a closed position, the pressure of the spring and flow through the control line on the back side of the piston are greater than the pressure of the material on the nose of the piston. The piston is proximate the head of the cylinder in the closed position which prevents material from flowing through the cylinder.

It is also common to use an o-ring to seal the cylinder when the piston is in the closed position. As the piston moves into the closed position, the nose of the piston moves through the center of the o-ring. The o-ring is trapped between the nose of the piston and the walls of the cylinder to seal the cylinder and prevent leakage of material past the piston and into the cylinder. The o-ring is kept in place in the cylinder by being placed in a groove inside the cylinder wall.

It is a problem that the piston may pull the o-ring from the groove as pressure moves the piston from the closed position to an open position. When the o-ring is dislodged from the groove, the seal created by the o-ring may not be adequate and undesirable leakage of material into the cylinder may occur. There is a need in the art for a retainer to prevent the o-ring from becoming dislodged from the groove of the cylinder.

SOLUTION

The above and other problems are solved and an advance in the art is achieved by the provision of a retainer for an o-ring and a tool for inserting and removing the retainer. The retainer of the present invention is a metal ring that is pressed through the o-ring so that the outer walls of the retainer remain inside the o-ring and press against the o-ring to hold the o-ring inside the groove. A first advantage of the retainer is that the retainer securely holds the o-ring in place in the cylinder. A second advantage of the retainer is that the retainer can be used in any condition and in any type of cylinder. This eliminates the need for different types of retainers in different operating conditions and in different types of cylinder. A third advantage of the retainer is that the piston is designed to have one end that is used to insert the retainer in the cylinder and a second end that can be used to remove the retainer. This eliminates the need for a special tool for inserting or removing the retainer.

In accordance with this invention, there is a groove in the cylinder wall proximate the head end of the cylinder. The head end of the cylinder wall has a ledge extending out into an opening in the head end below the groove. A ledge extending out from a cylinder wall or along the circumference of a piston will hereinafter be referred to as a step. An o-ring is placed inside the groove. A retainer is a ring made of metal or other rigid material. The retainer ring has an outer diameter that is approximately the diameter of the inside of the cylinder and an inner diameter that is less than an inside diameter of the step. The wall of the retainer is of a height that allows the retainer wall to extend into the o-ring when the retainer is at rest on the step on the head end of the cylinder.

The retainer is pressed into the cylinder and through the o-ring. One surface of the retainer is held in place by the step. A second surface of the retainer extends into the o-ring and retainer wall presses against the o-ring to hold the o-ring in the groove. The o-ring, in turn, presses against the retainer wall holding the retainer in place. In a preferred embodiment, both the first and second ends of the retainer walls have lead chamfers or angled edges to prevent damage to the o-ring during insertion and removal of the retainer.

Insertion and removal of the retainer can be completed using the piston as a tool. Insertion is completed using a first end or nose of the piston. The piston has a step around the diameter of the nose. The retainer fits over the nose with one surface of the retainer resting on the step. The piston pushes the retainer through the cylinder and through the o-ring until the other surface of the retainer comes to rest on the step near the head end of the cylinder.

Insertion of the o-ring and retainer is completed in the following manner. First, the o-ring is inserted into the groove inside the cylinder wall. The retainer is then placed into the cylinder from a first end of the cylinder opposite the head end of the cylinder. The retainer is slid into the cylinder until a first surface of the retainer is at rest on a surface of the o-ring. The piston is then placed nose first into the cylinder. The piston is pushed downward until the step on the nose contacts a second surface of the retainer. The retainer is pushed through the o-ring by the piston until the first surface of the retainer at rest on the step at the head end of the cylinder.

A back end of the piston is used to remove the retainer from the cylinder. The back end has a step with an outside diameter that is smaller than the inside diameter of the step at the head of the cylinder and that is larger than the diameter of the inside of the retainer. Removal of the retainer is performed in the following manner. First, the piston is removed from the cylinder. The back end of the piston is then inserted into an inlet at the head of the cylinder. The step on the back end of the piston contacts the inside diameter of the retainer and allows the back end of the piston to apply force to the retainer. The back end of the piston is then pushed upward through the cylinder. A force is exerted on the retainer that pushes the retainer through o-ring and through the cylinder.

DESCRIPTION OF THE DRAWINGS

The above and other features of this invention can be understood from reading the below Detailed Description and the following drawings.

DETAILED DESCRIPTION

Figure 1:
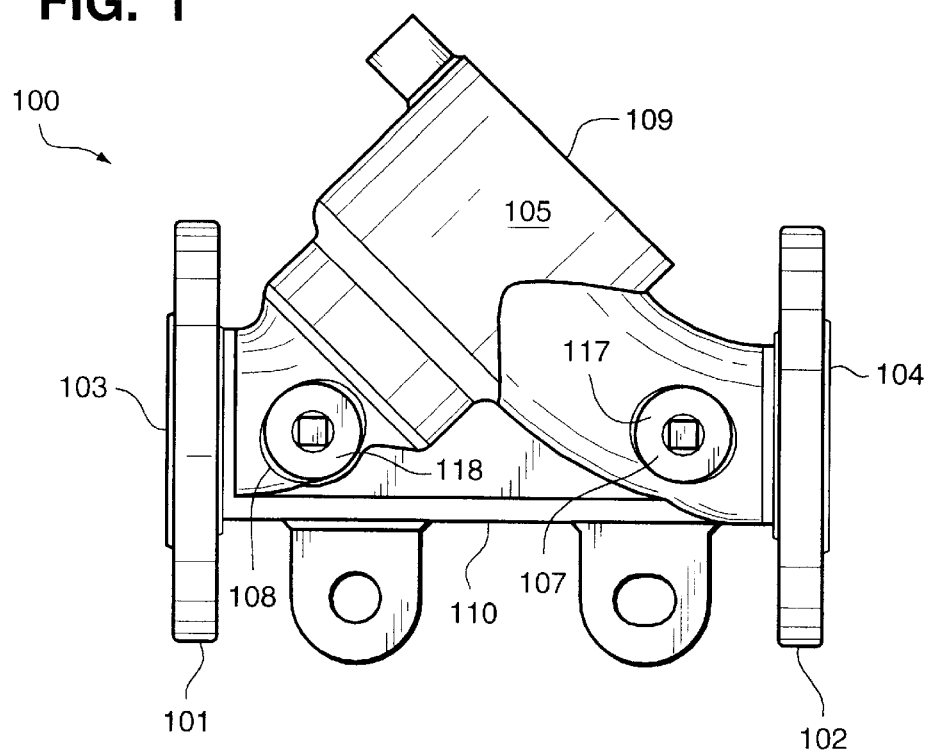
FIG. 1 illustrates a common control valve incorporating a retainer of the present invention.

FIG. 1 illustrates control valve 100 having a housing 110. Inlet flange 101 and outlet flange 102 connect control valve 100 to a pipeline (not shown). Material flows into control valve 100 through inlet 103 and exits control valve 100 through outlet 104. Piston assembly housing 105 forms a cylindrical cavity between inlet 103 and outlet 104. A piston assembly (illustrated in FIG. 3) is contained inside piston assembly housing 105 and regulates the flow of material through control valve 100.

Figure 2:
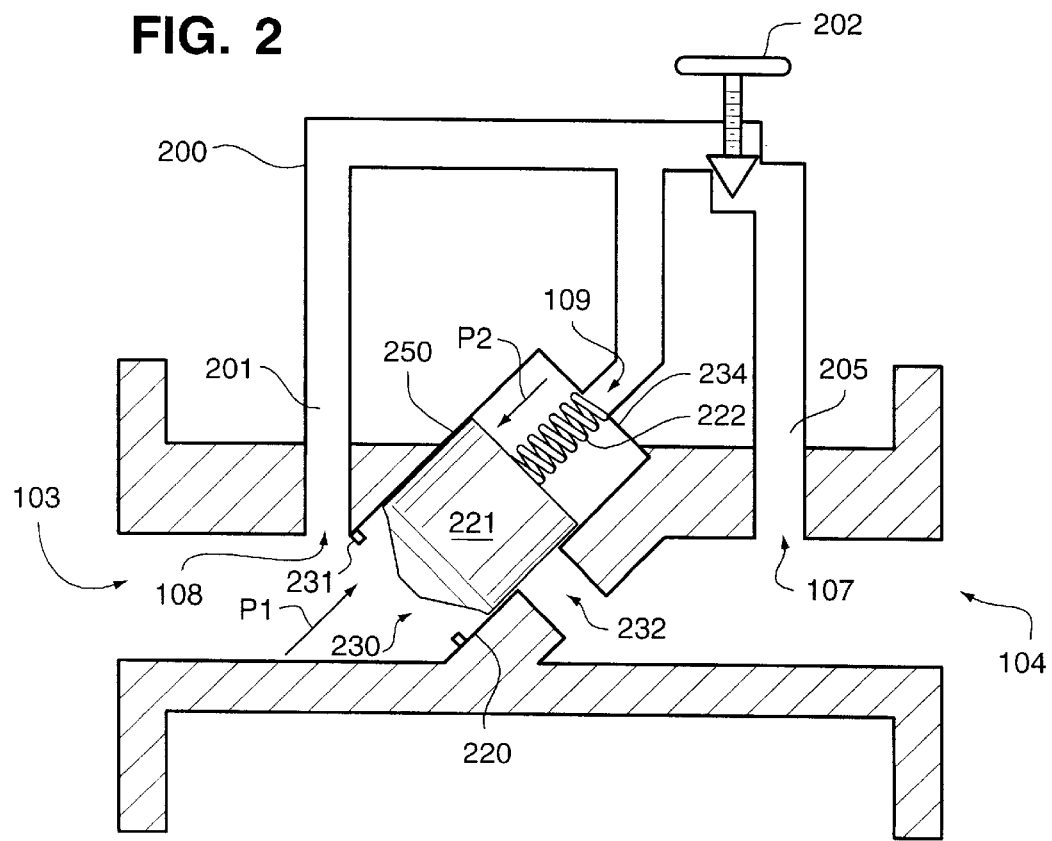
FIG. 2 illustrates a cross sectional view of the common control valve.

Control inlet port 108 is an opening in housing 110 proximate inlet 103 and diverts a material flow into a control pipeline (shown in FIG. 2). Control inlet port 108 is illustrated with a plug 118 threaded into x port 108. Control port 109 is an opening in a top side of piston assembly housing 105 for diverting a control material flow to a second end of a cylinder. Control outlet port 107 is an opening in housing 100 proximate outlet 104 and returns a material flow from a control line (shown in FIG. 2) to outlet 104. Plug 117 is illustrated threaded inside control outlet port 107.

FIG. 2 is a cross sectional view of control valve 100 connected to control line 200. Control line 200 has a first end 201 connected to control inlet port 108 for receiving material from the inlet of control valve 100. The material flows through control line 200 to a conduit connected to control port 109. The material then flows though control port 109 into a cylinder 220 of piston assembly 250. A control pilot valve 202 is down stream of y port 109 in control line 200. Control pilot valve 202 is a faucet assembly that can be adjusted to regulate the flow of material through control line 200. A second end 205 of control line 200 is connected to control outlet port 107 to return material from control line 200 to the material flow out of outlet 104.

Piston assembly 250 is comprised of a cylinder 220 and piston 221. Piston 221 is slidably mounted inside cylinder 220. Cylinder 220 has a head end 231 with an inlet opening 230 that is proximate the inlet 103 for receiving a flow of material from inlet 103. Outlet opening 232 is in a side wall of cylinder 220 and allows material to flow through cylinder 220 to outlet 104. Piston 221 slides inside cylinder 220 to regulate the material flow through cylinder 220. In a closed position, piston 221 is proximate head end 231 and prevents fluid from flowing into cylinder 220. In an open position, piston 221 is proximate a second end 234 of cylinder 220 and the flow path between inlet opening 230 and outlet opening 232 is unobstructed. Piston 221 can be in a position anywhere between the open and closed positions to partially obstruct the flow path and regulate the flow of material through cylinder 220.

Spring 222 has a first end fixedly attached to an upper inside wall of cylinder 220 and a second end fixedly attached to a second end of piston 221. Spring 222 is used to control the position of piston 221 inside cylinder 220. The position of piston 221 is controlled based upon a balanced pressure principle. A material flow from control port 109 applies a pressure P2 to a second end of piston 221. The material flow from inlet 103 applies pressure P1 to a nose end of piston 221.

When pilot valve 202 is closed material cannot flow to control outlet port 107. This causes pressure P2 on the second end of piston 221 to be equal to pressure P1 on the head end of piston 221. Pressure P2 exerted by the control flow and spring 222 biases piston 221 to the closed position when pilot valve 202 is closed. When pilot valve 202 is open the flow of material to control outlet port 107 reduces pressure P2 on the second end of piston 221. The force applied by P1 overcomes the force applied by P2 which causes piston 221 to move towards the open position. Material is allowed to flow through cylinder 220. The more pilot valve 202 is opened the more P2 is reduced which in turn controls the position of piston 221 in cylinder 220.

Figure 3:
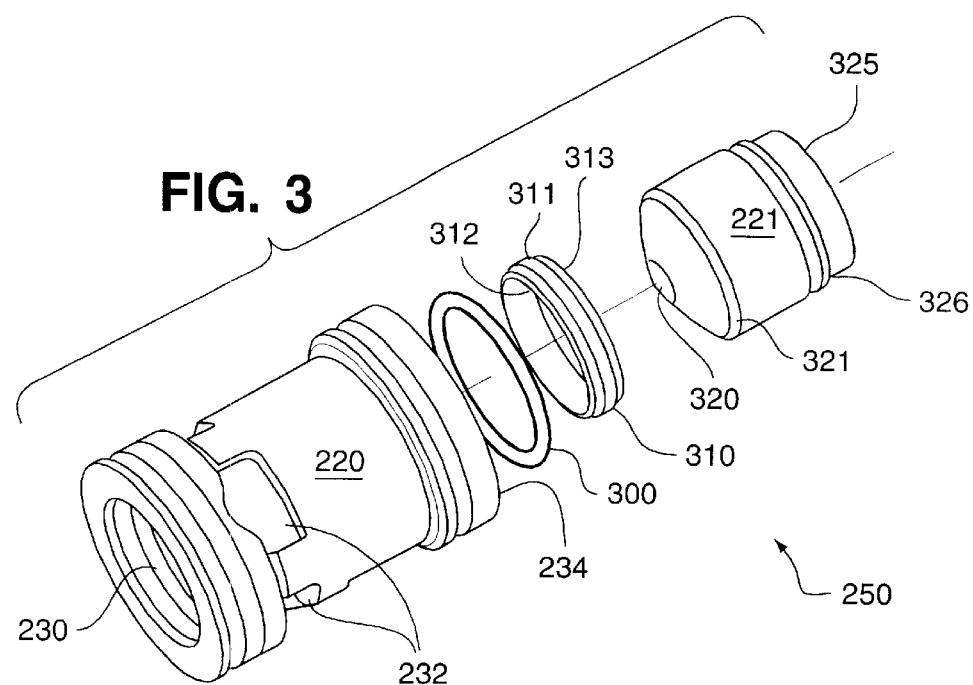
FIG. 3 illustrated an exploded view of a piston assembly from a first perspective.
Figure 4:
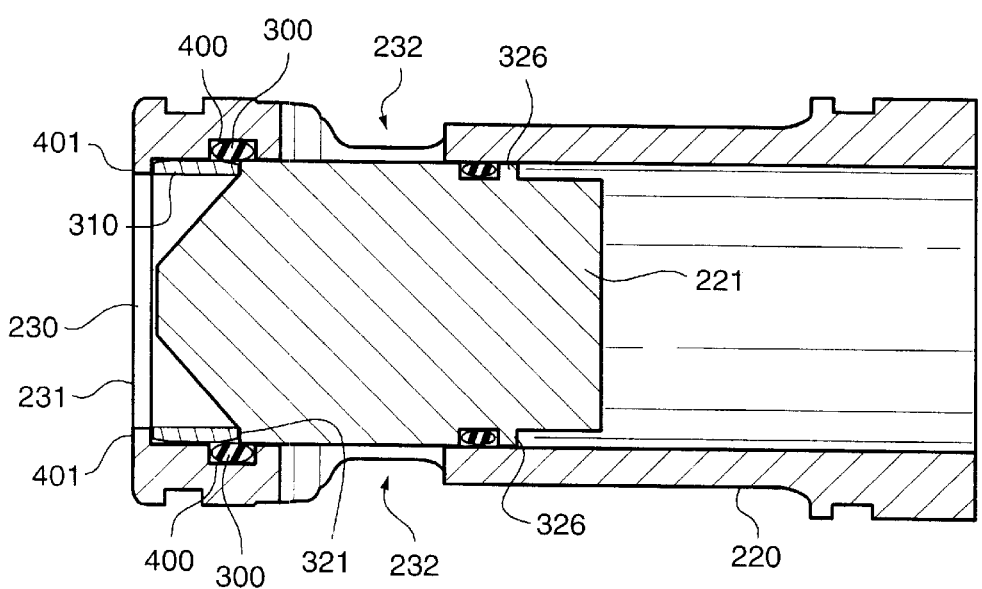
FIG. 4 illustrates a cross sectional view of the piston assembly.

When piston 221 is in the closed position, a seal is needed to prevent material from leaking around piston 221 and into cylinder 220. FIGS. 3 and 4 illustrate the components of piston assembly 250 that are used to seal cylinder 220 when piston 221 is in the closed position. FIG. 3 is an exploded view of the components of piston assembly 250 used for sealing cylinder 220. FIG. 4 is a cross sectional view of cylinder assembly 250 with piston 221 in the closed position. FIGS. 3 and 4 will be referred in the below description to better describe the relationship of components in the piston assembly 250.

Piston assembly 250 has an o-ring 300 that fits inside cylinder 220 to seal cylinder 220 when piston 221 is in the closed position. O-ring 300 is a circular piece of rubber or another resilient material formed in a ring. The circumference of o-ring 300 is slightly greater than the inside circumference of cylinder 220. O-ring 300 fits into groove 400 on the inside wall of cylinder 220 proximate the head end 231 of cylinder 220. Groove 400 is at a level in cylinder 220 that allows nose 320 of piston 221 to fit securely against o-ring 300 when piston 221 is in the closed position (as shown in FIG. 4).

In order to prevent o-ring 300 from being pulled out of groove 400 by piston 221 as piston 221 slides into towards the open position, retainer ring 310 is placed into cylinder 220. When inserted into cylinder 220, retainer ring 310 presses against o-ring 300 to prevent o-ring 300 from being pulled out of groove 400. Retainer ring 310 is a ring formed from a metal or other rigid material. Lead chamfers 312 and 313 are angled edges on retaining ring 310 allowing retaining ring 310 to slide into and out of place without damage to o-ring 300. Step 401 proximate orifice 230 is provided to support a second side of retaining ring 310.

Step 401 biases retaining ring in a position where a first side of retaining ring 310 is inside o-ring 300 and holding o-ring 300 inside groove 400. This allows retaining ring 310 and o-ring 300 to press against one another and to secure one another in place. The height of walls 311 of retainer ring 310 is determined by the height of groove 400. The inside diameter of retaining ring 310 is less then the inside diameter of step 401 to facilitate removal of retaining ring 310.

In order to eliminate the need for a tool to place retaining ring 310 inside cylinder 220, piston 221 is designed to be used in the insertion and removal process for retaining ring 310. Piston 221 has a nose 320 with a protruding step 321 around nose 320. (Step 321 has an outside diameter substantially equal to but greater than the inside diameter of retaining ring 310. Nose 320 fits into retainer ring 310 with step 321 contacting a first end of retaining ring 310 to be used in the insertion process described below.) A second end 325 of piston 221 has a protruding step 326 that has an outer circumference that is greater than inside circumference of retaining ring 310 and less than the outer circumference of step 401. Second end 325 of piston 221 can fit into head inlet opening 230 of cylinder 220 and can be used in the removal process described below.

Figure 5:
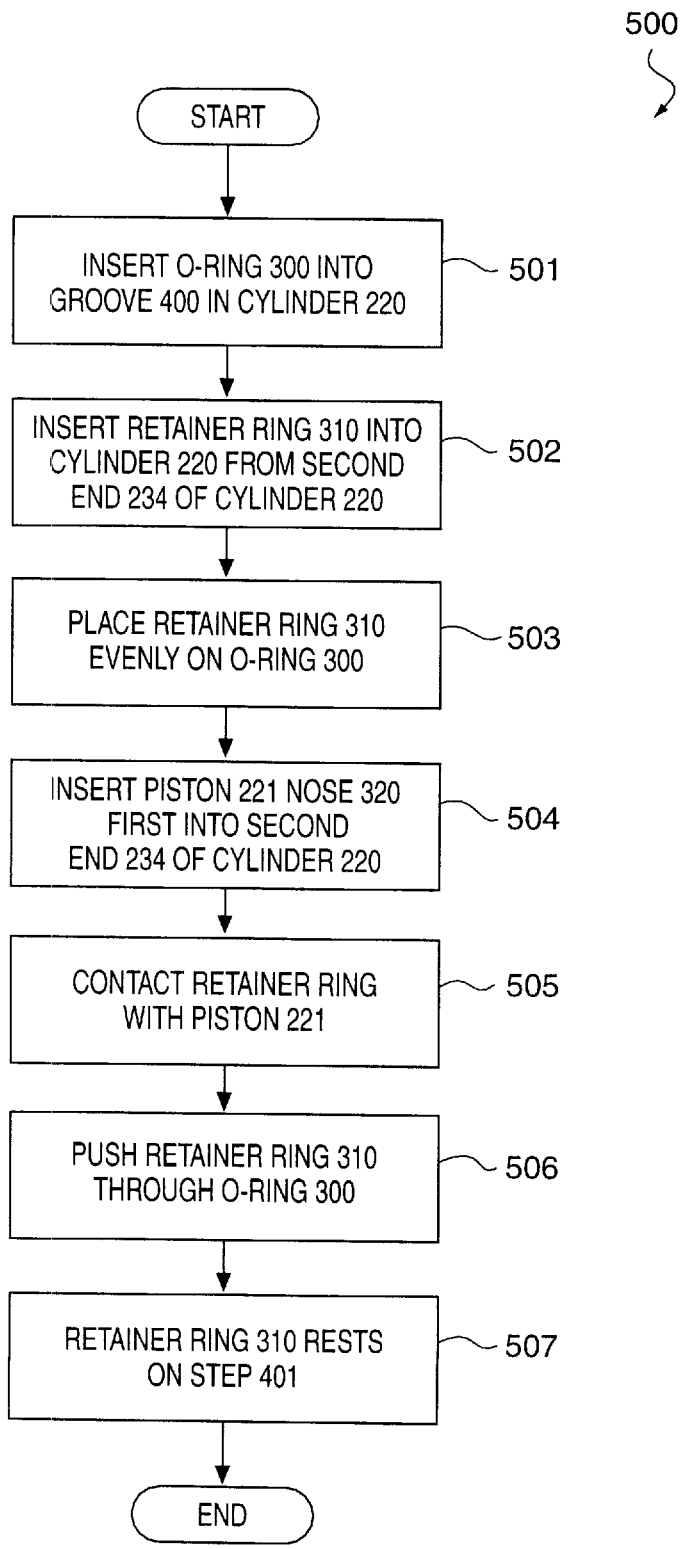
FIG. 5 illustrates a flow diagram of a process for inserting the retainer.

FIG. 5 is a flow chart of a process 500 for inserting o-ring 300 and retainer ring 310 into cylinder 220 using piston 221 as an insertion tool. Process 500 begins in step 501 by inserting o-ring 300 into groove 400 of cylinder 220. In step 502, retainer ring 310 is inserted into cylinder 220 from the second side 234. Retaining ring 310 is then rested so that a first end of retaining ring 310 is resting evenly on o-ring 300 in step 503.

In step 504, piston 221 is inserted into a second end 234 of cylinder 220 directly with nose 320 directly over retaining ring 310. Nose 320 passes through retaining ring 310 until step 321 is in contact with a second surface of retaining ring 310 in step 505. Piston 221 is then pushed into cylinder 220 applying a force to retaining ring 310 in step 506. Lead chamfer 312 guides retaining ring 310 over an inner surface of o-ring 300. Process 500 ends in step 507 with retaining ring 310 being pushed through o-ring 300 until a first surface of retaining ring 310 contacts step 401.

Figure 6:
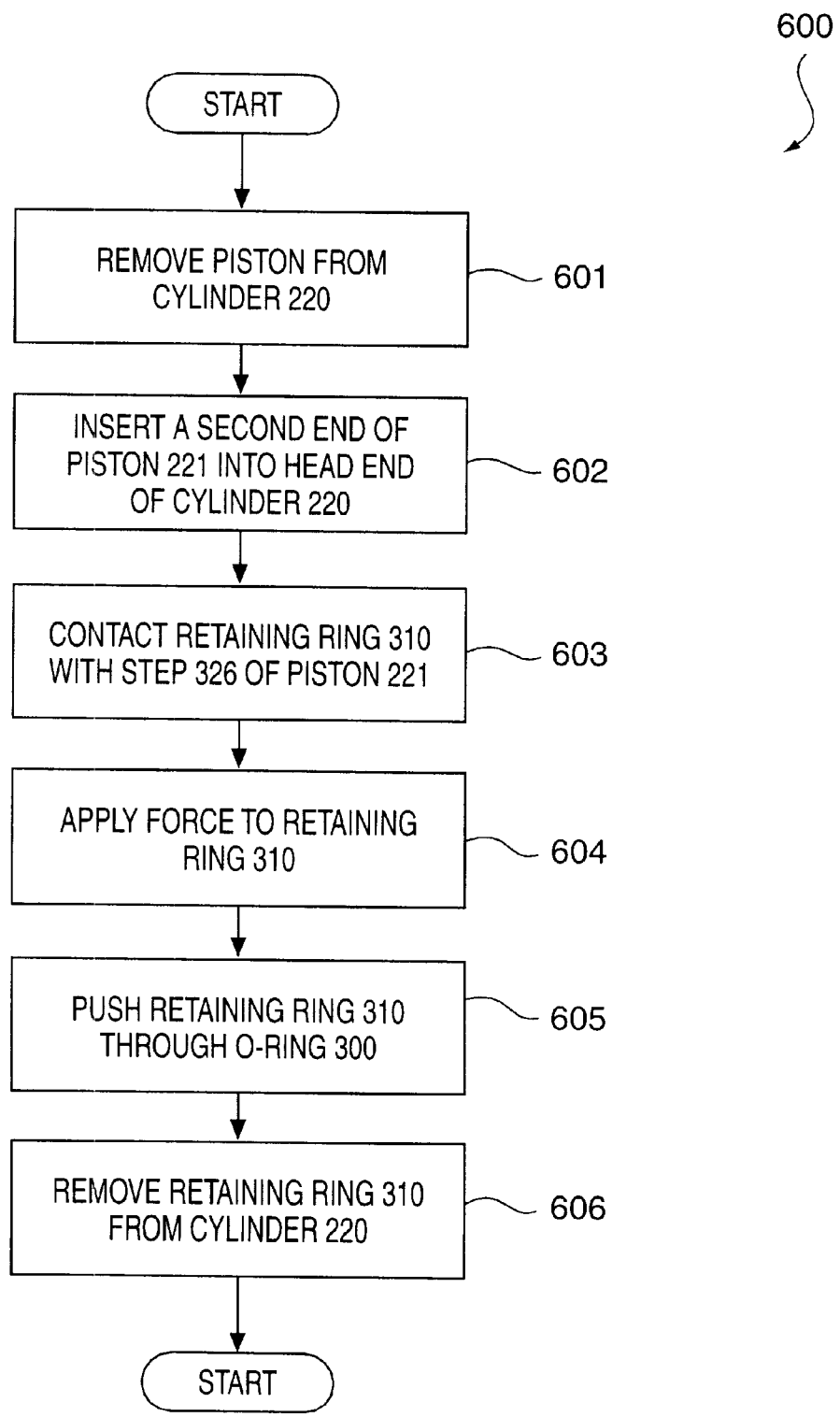
FIG. 6 illustrates a flow diagram for removing the retainer.

FIG. 6 illustrates a removal process 600 for removing retaining ring 310 using a second end of piston 221. Process 600 begins in step 601 by removing piston 221 from cylinder 220. In step 602, a second end of piston 221 is inserted into orifice 230 of cylinder 220. Step 326 of piston 221 contacts a first surface of retainer ring 310 in step 603. A force is applied to retaining ring 310 by pushing piston 221 into cylinder 220 in step 604. In step 605, retaining ring 310 passes through o-ring 300 guided by lead chamfer 313. Process 600 ends in step 606 by removing retaining ring 310 from cylinder 220 through an opening in the second side 234 of cylinder 220.

The above described is one possible exemplary embodiment of a main valve seal retainer and tool for use in inserting and removing the retainer. It is possible that one skilled in the art can and will design alternative retainers and tools that infringe on this invention as claimed below either literally or through the Doctrine of Equivalents.

What is claimed is:

1. A system for sealing a head end of a cylinder comprising:

a piston slidably mounted inside said cylinder;

an o-ring for sealing said cylinder when said piston is in a closed position;

a groove in an inside wall of said cylinder proximate said head end of said cylinder for receiving said o-ring;

retainer means protruding into said o-ring inside said groove for applying a force to said o-ring to prevent said o-ring from being forced out of said groove; and means in said cylinder for preventing movement of said retainer means.

2. The system of claim 1 further comprising:

chamfer means on a first end of said retainer means for preventing damage to said o-ring during insertion of said retainer means into said cylinder.

3. The system of claim 1 further comprising:

chamfer means on a second end of said retainer means for preventing damage to said o-ring during removal of said retainer means from said cylinder.

4. The system of claim 1 wherein said means for preventing movement comprises:

a step protruding from the circumference of said inside wall of said cylinder between said groove and said head end.

5. The system of claim 1 further comprising:

means on a first end of said piston for inserting said retainer means into said cylinder.

6. The system of claim 5 wherein said means for inserting on said first end of said piston is a step protruding from a nose end of said piston.

7. The system of claim 1 wherein said means for removing is a step protruding from the circumference of said second end of said piston.

8. The system of claim 1 wherein said retainer means is a retaining ring made from rigid material.

* * * * *

UNITED STATES PATENT AND TRADEMARK OFFICE
CERTIFICATE OF CORRECTION

PATENT NO. : 6,152,423
DATED : November 28, 2000
INVENTOR(S) : Jimmy Brooks Nichols It is certified that error appears in the above-identified patent and that said Letters Patent is hereby corrected as shown below:

On title page, item 73 Assignee
  replace "Micro Motion, Inc., Boulder, Colo."
  with --Emerson Electric Co., Inc., St. Louis, Missouri--

On title page, item 57 Abstract
  replace "retainer ring applies a force to the retainer ring which holds"
  with --retainer ring applies a force to the o-ring which holds--

On title page, item 57 Abstract
  replace "to the retainer ring holding the o-ring in place."
  with --to the retainer ring holding the retainer ring in place.--

Col. 3, line 34
  replace "valve 202 is down stream of y port 109 in control line 200."
  with --valve 202 is down stream of control port 109 in control line 200.--

Col. 6, line 8
  replace "said o-ring from being forced out of said groove; and"
  with --said o-ring from being forced out of said groove;--

Col. 6, line 10
  replace "retainer means."
  with --retainer means; and means on a second end of said piston for removing said retainer means from said cylinder.--

Signed and Sealed this

Twenty-ninth Day of May, 2001

Attest:

NICHOLAS P. GODICI

*Attesting Officer*    *Acting Director of the United States Patent and Trademark Office*